United States Patent [19]

Martinez et al.

[11] Patent Number: 4,762,627

[45] Date of Patent: Aug. 9, 1988

[54] CORROSION INHIBITORS

[75] Inventors: Robert G. Martinez; Duane S. Treybig, both of Lake Jackson; Terry W. Glass, Richwood, all of Tex.

[73] Assignee: The Dow Chemical Company, Midland, Mich.

[21] Appl. No.: 30,657

[22] Filed: Mar. 24, 1987

Related U.S. Application Data

[63] Continuation-in-part of Ser. No. 691,329, Jan. 14, 1985, abandoned.

[51] Int. Cl.$^4$ ............................................. C23F 11/14
[52] U.S. Cl. ................................ 252/8.555; 252/390; 252/392; 422/7; 422/16
[58] Field of Search ............... 252/8.555, 8.551, 8.553, 252/390, 392; 422/7, 12, 16

[56] References Cited

U.S. PATENT DOCUMENTS

| | | | |
|---|---|---|---|
| 2,643,227 | 6/1953 | Hughes | 252/392 X |
| 2,643,977 | 6/1953 | Hughes | 252/8.555 |
| 2,643,978 | 6/1953 | Hughes | 252/390 X |
| 2,727,003 | 12/1955 | Hughes | 252/8.555 |
| 2,877,179 | 3/1959 | Hughes | 252/8.555 |
| 3,025,313 | 3/1962 | Gunderson | 252/8.555 X |
| 3,077,454 | 2/1963 | Monroe et al. | 252/148 |
| 3,262,791 | 7/1966 | Dickson et al. | 252/392 X |
| 3,932,296 | 1/1976 | Byth | 252/148 |
| 4,174,370 | 11/1979 | Alink et al. | 252/8.555 X |

*Primary Examiner*—Herbert B. Guynn

[57] ABSTRACT

The thermally rearranged oligomers prepared by the reaction of an $\alpha,\beta$-ethylenically unsaturated aldehyde with organic amines are thermally rearranged to give a more thermally stable product with labile amino hydrogens available for further reaction, after reaction with a carboxylic acid, organic halide or an epoxide containing compound are employed as corrosion inhibitors in a process for preventing corrosion of ferrous metals in contact with corrosive brine, oil and gas well fluids.

35 Claims, No Drawings

CORROSION INHIBITORS

CROSS-REFERENCE TO RELATED APPLICATION

This application is a continuation-in-part of application Ser. No. 691,329, Jan. 14, 1985 now abandoned.

FIELD OF THE INVENTION

The present invention relates to new and useful corrosion inhibitors and in particular to corrosion inhibitors which materially reduce the effects of attack of reactive materials on metals of construction.

BACKGROUND OF THE INVENTION

In oil producing applications, metal tubing, sucker rods, valves, screens, coatings, pumps, and the like are subjected to the action of extremely corrosive fluids and gases. Such sweet and/or sour corrosive compositions can contain dissolved materials such as hydrogen sulfide, sulfur dioxide, carbon dioxide, oxygen, mineral acids, organic acids, and the like, as well as mixtures thereof.

Numerous processes for inhibiting the corrosion of metals caused upon exposure to corrosive oil and gas well fluids have been proposed. See, for example, U.S. Pat. Nos. 2,643,977 and 3,077,454. Unfortunately, such processes are not effective under the conditions of high temperatures and pressures experienced by metal equipment in extremely deep oil and gas wells. Such conventional corrosion inhibitors can have a tendency to degrade, volatilize, or polymerize causing formation damage and/or inadequate corrosion protection. In view of the deficiencies of the prior art, it would be highly desirable to provide a corrosion inhibitor which is easily prepared and can be effectively employed under very high temperature and pressure conditions.

SUMMARY OF THE INVENTION

The present invention pertains to a process for reducing or preventing the corrosion of ferrous alloys in contact with corrosive liquids or gases which process comprises contacting the surface of said ferrous metal alloy with a corrosive inhibiting amount of a corrosion inhibitor composition comprising the reaction product of (I) the reaction product of (A) at least one aliphatic $\alpha,\beta$-monoethylenically unsaturated aldehyde having from about 3 to about 6 carbon atoms: and (B) at least one organic polyamine represented by the formula

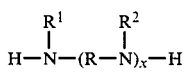

wherein R is a divalent saturated $C_2$ to $C_4$ aliphatic hydrocarbon group; each $R^1$ and $R^2$ is independently hydrogen or a saturated alkyl amino or an alkyloxy group containing from 2 to about 4 carbon atoms or when taken together, $R^1$ and $R^2$ form a bridging alkylene radical containing from 2 to about 4 carbon atoms such that R, $R^1$ and $R^2$ and two nitrogen atoms form a heterocyclic ring containing 4 carbon atoms; x has a value from 1 to about 8 and components (A) and (B) are employed in a mole ratio of (A) to (B) of from about 1:1 to about 1:6; and wherein said reaction product of components (A) and (B) is thermally treated at a temperature of at least about 180° C. for a time sufficient to render the resultant thermally treated product with a stablility temperature at least 25° C. above the stability temperature of the untreated product; and (II) (A) at least one saturated or unsaturated, cyclic or acyclic aliphatic mono- or polycarboxylic acid having from about 2 to about 54 carbon atoms; or (B) at least one saturated or unsaturated, cyclic or acyclic aliphatic alkyl monohalide or alkyl polyhalide having from about 2 to about 50 carbon atoms; or (C) a combination of (A) and (B);

wherein components (I) and (II) are employed in quantities which provide from about 0.4 to about 1, suitably from about 0.55 to about 0.85, more suitably from about 0.65 to about 0.75 equivalent of carboxyl or halide groups from component (II) for each theoretically active amino hydrogen atom contained in component (I).

The present invention provides corrosion protection to metal compositions exposed to corrosive gases and/or liquids at high temperatures and pressures, such as are experienced in deep oil and gas wells.

DETAILED DESCRIPTION OF THE INVENTION

The corrosion inhibitors of the present invention act to protect metal compositions from corrosive effects of fluids, liquids and/or gases, which are present in brine, oil and gas wells in either surface equipment and piping or in down hole well environments. Metal compositions typically include steel, iron, ferrous alloys, and other alloys of which typical sucker rods, valves, pumps, etc. are comprised.

The $\alpha,\beta$-ethylenically unsaturated aldehydes useful herein can be generally represented by the formula:

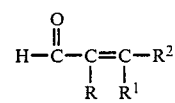

wherein each R, $R^1$ and $R^2$ are independently hydrogen, an alkyl group, or a substituted alkyl group wherein said substituent groups include, for example, halo, alkoxy and amino groups. Examples of suitable $\alpha,\beta$-monoethylenically unsaturated aldehydes are disclosed in U.S. Pat. No. 3,459,710 which is incorporated herein by reference. Other suitable aldehydes include, for example, acrolein, crotonaldehyde and hexenal. The preferred $\alpha,\beta$-ethylenically unsaturated aldehyde is acrolein, or mixtures thereof with other aldehydes.

The organic polyamines of this invention can include those organic diamines of the type disclosed in the aforementioned U.S. Pat. No. 3,459,710 as well as those polyamines disclosed in U.S. Pat. No. 4,292,413 which are incorporated herein by reference. Other polyamines include, for example, triethylenetetraamine, tetraethylenepentamine, pentaethylenehexamine, polyoxypropyleneamine, iminobispropylamine, aminoethylethanolamine, and the like as well as mixtures thereof. In addition, monofunctional amines that can be utilized include diglycolamines, dodecylamine, cocoamine, hexadecylamine, octadecylamine, tallowamine, and the like. Of the foregoing polyamines, those polyamines containing at least one primary amine are preferred; with those polyamines capable of forming imidazolidine or hexahydropyrimidine moieties or substituted moieties thereof being most preferred. Polyamines can be partially alkoxylated or partially polyalkoxylated so long as they contain at least one active amine hydrogen. Preferred polyamines are ethylenediamine and propylenediamine. Suitable polyamines also include the aminated polyoxyalkylene polyols.

The compounds comprising a functionality and/or functionalities capable of undergoing a reaction, quaternization or neutralization with an amine (i.e., substituent compounds) include, for example, compounds containing carboxylic acid moieties, organic halide moieties, epoxide moieties, and the like. For example, a carboxylic acid moiety can react with an amine to form a salt, amide or amidine-type linkage. Most preferably, substituent compounds include the polycarboxylic acids, organic polyhalides and polyepoxides. Such compounds are capable of introducing desired crosslinking to the product. Monocarboxylic acid compounds, organic monohalides and monoepoxide compounds can be employed. Examples of suitable carboxylic acids include acetic acid, benzoic acid, phthalic acid, terephthalic acid, octanoic acid, myristic acid, palmitic acid, oleic acid, isostearic acid, capric acid, caprylic acid, lauric acid, tall oil fatty acids, dimerized and trimerized tall oil fatty acids, dimerized and trimerized tall oil fatty acids, napthenic acids, dimer acids, trimer acids and similar mono- and polycarboxylic acids. Other suitable acids are disclosed in U.S. Pat. No. 4,339,349, which is incorporated herein by reference. Examples of suitable organic halides are disclosed in U.S. Pat. No. 4,315,087 which is incorporated herein by reference. Examples of suitable mono- and polyepoxides include epoxidized vegetable oils such as epoxidized linseed oil, epoxidized carboxylic acids such as epoxidized oleic acid, the glycidyl ethers, and the like. Other suitable epoxide compounds are disclosed in U.S. Pat. No. 4,292,413 which is incorporated herein by reference. Other suitable compounds comprising a functionality or functionalities capable of undergoing a reaction, quaternization or neutralization with an amine include, for example, inorganic acids, aldehydes, alkylene oxides, cyanides, nitriles, sulfur containing compounds such as mercaptans, and the like. Preferably, the substitutent compound has a predominantly hydrophobic character.

Products used in this invention are preferably prepared by first reacting the organic polyamine with the α,β-ethylenically unsaturated aldehyde. Preferably, the reaction is carried out in an inert atmosphere and at a temperature between about 0° C. and about 150° C. The choice of inert solvent is generally dependent upon the boiling point of the polyamine, the solubility of the polyamine and the solubility of the resulting oligomer or polymer. Advantageously, the solvent is one in which both the monomers and resultant oligomer are soluble. Suitable solvents include methanol, ethanol, butanol, benzene, water, dioxane, dimethylformamide, tetrahydrofuran, and the like.

Preferably one mole of polyamine is reacted with 0.1 to 1.0 mole of unsaturated aldehyde. Preferably, the organic polyamine is dissolved in a suitable solvent in a reaction vessel. A solution of the unsaturated aldehyde and suitable solvent is then contacted with the polyamine solution, preferably in a slow manner. The reaction mixture can be cooled or heated. Solvent can be removed by distillation. Preferably, a solvent, such as isopropanol can be added to the reaction mixture in order to create an azeotropic mixture for removing solvent and by-product.

Oligomer or polymer products usually have an average molecular weight less that about 1,000 and are obtained from the reaction of α,β-ethylenically unsaturated aldehydes with organic polyamines. The oligomers or polymers within the scope of this invention comprise compounds that can comprise vinyl, imine, enamine, ether, and hydroxyl functional groups. The reaction of an amine containing piperazine rings with an α,β-ethylenically unsaturated aldehyde introduces piperazine rings into the constituents of the product. The reaction of the carbonyl of α,β-monoethylenically unsaturated aldehyde with a primary amine forms an imine which readily cyclizes if labile (where the term "labile" is as defined in U.S. Pat. No. 4,315,087, which is incorporated herein by reference) amine hydrogens are available, preferably in the gamma or delta position relative to the nitrogen of the imine. An imidazolidine ring is formed from the reaction of the carbonyl of an α,β-monoethylenically unsaturated aldehyde with an ethylenepolyamine while a hexahydropyrimidine ring is formed from the reaction of the carbonyl of an α,β-monoethylenically unsaturated aldehyde with a propylenepolyamine. Some of the possible constituents of the oligomers formed from the reaction, prior to thermal rearrangement, of, for example, acrolein with ethylenediamine are believed to be represented by the following structures, although the applicants do not wish to be limited by this theory:

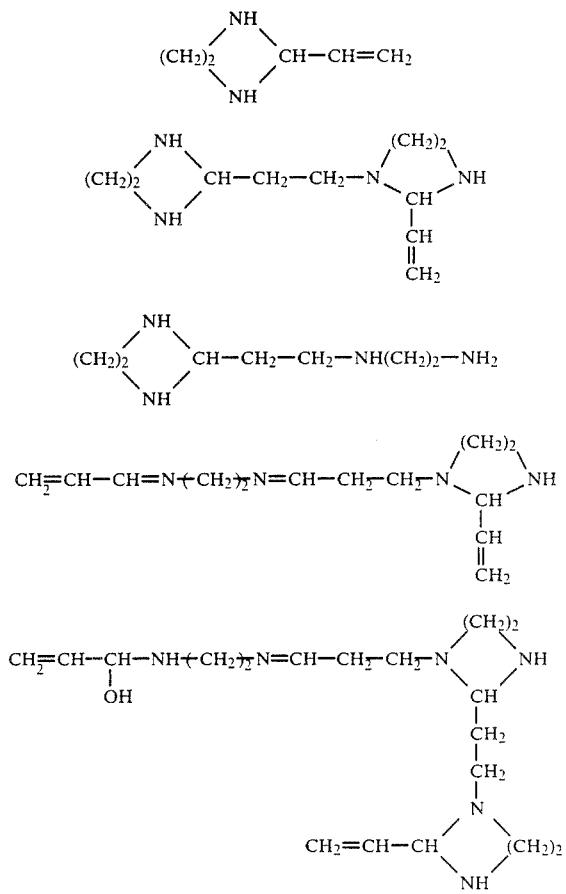

The thermal treatment is usually conducted by heating the oligomer or polymer from the reaction of $\alpha,\beta$-ethylenically unsaturated aldehyde with an organic polyamine while stirring in air or an inert atmosphere such as, for example, nitrogen, helium, neon, zenon, argon, mixtures thereof and the like. The temperature required to achieve the increase in thermal stability depends upon the particular oligomer or polymer being treated. However, a temperature of at least about 180° C., preferably from about 190° C. to about 350° C. is usually required. In some instances, lower temperatures could produce the desired increase in thermal stability. The oligomer or polymer is heated for a period of time to sufficiently rearrange the original oligomers or polymers such that the resultant product has an increase in thermal stability of at least 25° C. above that of the product prior to heat treatment. The period of time in which the oligomer or polymer is heated can range from about 10 minutes to about 48 hours. The preferred period of time for thermally rearranging the oligomer or polymer is 30 minutes to 2 hours. In the case where the oligomer or polymer results from the reaction of acrolein with an ethylenepolyamine, pyridines and pyrazines having methyl substituents are formed and are evolved or reside with the final product. Also, the imine concentration increases during thermal rearrangement. Generally, the thermally rearranged oligomer or polymer is more thermally stable than the original oligomer or polymer. The preferred atmosphere for stirring the oligomer or polymer during thermal rearrangement is nitrogen.

The product which is isolated can be contacted with the compound comprising a functionality or functionalities capable of undergoing a reaction, quaternization or neutralization with an amine. The previously described product is dissolved or dispersed in a suitable solvent and contacted with the substituent compound which is also dissolved in a suitable solvent. The amount of substituent compound which is employed can vary such that about 1 to about 100 percent of the available amino hydrogens of the polyamine/unsaturated aldehyde product can be reacted with reactive functionalites of the substituent compound. This resulting product can, if desired, be isolated using techniques such as distillation to remove by-products and solvent.

The resulting thermally treated product can be employed as a corrosion inhibitor as are conventional corrosion inhibitors. Generally, the product can be employed in corrosion inhibitor formulations as are known in the art. For example, the product can be dispersed or dissolved in a suitable carrier liquid or solvent such as water, alcohols, aromatic and aliphatic hydrocarbons, and the like, or mixtures thereof. Other additives include demulsifiers, water wetting agents, surfactants, viscosifiers, commingled gases, defoamers, other corrosion inhibitors such as polymeric materials and salts, organic and inorganic acids, iron control agents, sequestering and/or chelating agents, phosphates, quaternaries, amine salts, and the like. For example, surface active agents are used to assure complete dispersion of active ingredients throughout the corrosion inhibitor composition and thus provide a better contact of the corrosion inhibitor with the surface of the metal compound which is being protected. The corrosion inhibitors of this invention form films on metal surfaces at least as readily as those known film forming corrosion inhibitors.

The corrosion inhibitor of this invention is employed in a functionally effective amount. That is, any quantity of corrosion inhibitor which will provide some degree of inhibition of corrosion is sufficient. Typical amounts of corrosion inhibitor which are employed in an oil and/or gas well treatment can range from about 5 to about 100,000 ppm based on the weight of corrosive well fluids in contact with the metal compositions which are to be protected. For continuous treatment, the amount of inhibitor can range from about 5 to about 2,000 ppm, suitably from about 50 to about 1,000, most suitably from about 100 to about 200 ppm based on the weight of corrosive well fluids in contact with the metal compositions which are to be protected. For batch treatment, the amount of inhibitor can range from about 10,000 to about 100,000, suitably from about 40,000 to about 60,000 ppm based on the weight of corrosive well fluids in contact with the metal compositions which are to be protected. Amounts of corrosion inhibitor in excess of 50–60,000 ppm can provide additional corrosion inhibition but at increased expense.

The corrosion inhibitors of this invention are highly stable to high temperatures and high pressures. Typically, corrosion inhibitors are employed in applications where temperatures range from about 100° F. (37.7° C.) to in excess of about 500° F. (260° C.), depending upon the composition of the polymer product. The corrosion inhibitors of this invention are especially useful at temperatures ranging from 300° F. (148.8° C.) to about 450° F. (232.2° C.).

The corrosion inhibitors of this invention inhibit corrosion to metal compositions used in down hole applications, preferably in excess of 80 percent corrosion protection. The corrosion inhibitors advantageously inhibit corrosion to metal compositions at elevated temperatures exceeding 250° F. in oil and gas well applications. Useful applications include oil and/or gas well drilling, completion, workover, stimulation, transfer, processing and storage applications.

The following examples are presented to further illustrate but not limit the scope of this invention.

EXAMPLE 1

A. Preparation of Acrolein/Ethylenediamine Oligomer at a Molar Ratio of 1/1 Respectively Acrolein is distilled in the presence of 358 ppm and 379 ppm of hydroquinone in the boiling and receiving flasks, respectively. A solution of distilled acrolein was prepared by mixing 282.1 grams (g) (5 moles) acrolein with about 155 g methanol.

Into a reactor equipped with stirrer, thermometer, condenser, and addition funnel with nitrogen inlet tube was placed a solution of 300 g (5 moles) ethylenediamine and about 510 g methanol. The reactor contents were stirred under nitrogen atmosphere while being held at a temperature of about 4° C.

The acrolein solution was added to the reactor over a period of 160 minutes (9600 s) at such a rate that the rise in temperature did not exceed 23° C. The mixture was subjected to rotary evaporation at 100° C. An amount of isopropanol was added to the mixture and said mixture was again subjected to rotary evaporation at 100° C. The product was a yellowish viscous liquid.

B. Thermal Treatment of Oligomer

Into a one liter reactor equipped with a condensing assembly, stirrer, thermometer, addition funnel, and nitrogen inlet tube was placed 210 g of the oligomer product from A above. The condensing assembly consisted of a Dean Stark trap, cold water condenser and dry ice-acetone cold finger. The reactor contents were stirred under nitrogen atmosphere at 125° C. for 60 minutes (3600 s). Then the reactor contents were heated at 10° C. increments at 60 minute intervals up to 250° C. Overhead and bottom samples were caught at each 10° C. interval.

Infrared spectra of the bottom sample indicated the oligomer product had undergone thermal rearrangement. The infrared spectra at 125° C. showed bands at 1655, 1630 and 1600cm$^{-1}$. The band at 1655cm$^{-1}$ was assigned to C=N stretch. The absorption at 1630cm$^{-1}$ was attributed to C=C stretch. The absorption at 1655 and 1630 cm$^{-1}$ increased upon heating the polymer product up to 190° C. Above 190° C., the band at 1600cm$^{-1}$ was the predominant absorption of the three bands.

The infrared spectra at 125° C. also showed absorption bands at 3270, 2940, 2800, 1260 and 900cm$^{-1}$. The absorption band at 3270cm$^{-1}$ was assigned to N—H stretching vibration of a secondary amine. Above 190° C. a broad absorption band at 3400cm$^{-1}$ replaced the 3270cm$^{-1}$ band. The absorption bands at 2940 and 2800cm$^{-1}$ were assigned to C—H stretch. At 125° C., these bands were of similar intensity. Above 190° C., the band at 2940cm$^{-1}$ was slightly more intense than the band at 2800cm$^{-1}$. Above 190° C., the absorptions at 1260 and 900cm$^{-1}$ disappeared.

Overhead samples collected in the Dean Stark trap were analyzed by electron impact mass spectroscopy. Methylpyridine was identified only in overhead samples collected at and above 135° C. Ethanamine, pyrazine, methylpyrazine, ethylpyrazine, dimethylpyridine, ethylpyridine, trimethylpyridine, and ethylmethylpyridine were identified along with methylpyridine in the overhead fraction collected at 250° C.

The reactor bottom samples were analyzed with methane chemical ionization probe mass spectroscopy. [M+1]$^+$fragments corresponding to the molecular weight of methylpyridine was observed only in the bottom samples collected at and above 170° C. [M+1]$^+$fragments corresponding to the molecular weights of $C_2$-pyrazine, $C_3$-pyrazine, $C_4$-pyrazine and $C_5$-pyrazine were present in addition to that corresponding to methylpyridine in the bottom samples collected at and above 180° C. The bottom sample collected at 250° C. was a dark brown hard solid at room temperature that had a distinct pyridine odor.

The number average molecular weight (Mn) and weight average molecular weight (Mw) of the thermally treated product was determined by gel permeation chromatography with methanol as the eluent. Monoethylene glycol and E-200 polyglycol served as standards. Between 125°–190° C., the Mn varied between 196–235 and the Mw varied between 394–423. Between 200°–250° C., the Mn varied between 100–130 and Mw varied between 234–280.

EXAMPLE 2

A. Preparation of Acrolein/Mixture of Tetraethylene-Pentamine, Pentaethylenehexamine, Hexaethylene-Heptamine Oligomer Into a jacketed reactor equipped with a mechanical stirrer, thermometer, condenser, and addition funnel is placed a solution containing 771 grams (3.15 moles) of a polyalkylene polyamine product having an average molecular weight higher than tetraethylenepentamine commercially available from The Dow Chemical Company as Ethyleneamine E-100 and 495 grams of anhydrous methanol. The reactor contents were stirred under nitrogen atmosphere while cooled to 3° C. A solution of distilled acrolein was prepared by mixing 282 grams (5.03 moles) of acrolein with 323 grams of anhydrous methanol. The acrolein solution was added to the reactor using an addition funnel over a period of 250 minutes (15000 s). After reaction completion, the mixture was subjected to rotary evaporation at 100° C. An amount of isopropanol was added to the mixture and again subjected to rotary evaporation. The resultant product was an amber colored viscous liquid.

B. Thermal Treatment of Ologomer

Into a one liter reactor equipped with a condenser assembly, mechanical stirrer, nitrogen inlet tube, and thermometer was placed 139 grams of the oligomer product from A above. The condenser assembly consisted of a Dean Stark trap and chilled glycol condenser. The reactor contents were stirred under the nitrogen atmosphere at 100° C. for 1 hour (3600 s). The reactor contents were heated incrementally at 60 minute intervals to 350° C. Overhead and bottom samples were caught at each interval.

Overhead samples collected in the Dean Stark trap were analyzed by electron impact mass spectroscopy. Methylpyridine, ethylpyridine, dimethylpyridine and methylethylpyridine were identified in the overhead fractions collected between 150° and 300° C. Methylpyridine was the most concentrated of these constituents. Dimethylpyrazine, methylethylpyrazine and $C_4$-pyrazine were identified in the overhead fractions collected at and above 300° C.

EXAMPLE 3

Thermal Stability

The thermal stability of the products of this invention was determined by differential scanning calorimetry (DSC) scan of various samples using a DuPont Model 1090 Thermoanalyzer. In the differential scanning calorimetry analysis, the samples were placed in an aluminum pan and programmed from 25° to 500° C. at 10° C./min. with a nitrogen purge. The samples tested were the thermally rearranged acrolein/ethylenediamine oligomers and the acrolein/mixture of tetraethylenepentamine, pentaethylenehexamine and hexaethyleneheptamine oligomers prepared as described in Examples 1 and 2, respectively. Results for the thermally rearranged acrolein/ethylenediamine oligomers prepared in Example 1 are given in Table I.

TABLE I

| Thermal Treatment Temperature | Initial Decomposition DSC |
|---|---|
| NONE* | 200° C. |
| 125* | 160° C. |
| 135* | 150° C. |
| 160* | 200° C. |
| 170* | 210° C. |
| 180 | 280° C. |
| 250 | 300° C. |

*Not an example of this invention.

Results for the thermally rearranged acrolein/mixture of tetraethylenepentamine, pentaethylenehexamine, and hexaethyleneheptamine oligomers as prepared in Example 2 are given in Table II.

TABLE II

| Thermal Treatment Temperature | Initial Decomposition DSC |
|---|---|
| NONE* | 150° C. |
| 100* | 160° C. |
| 110* | 160° C. |
| 140* | 160° C. |
| 160* | 170° C. |
| 180 | 190° C. |
| 240 | 250° C. |
| 250 | 250° C. |
| 280 | 230° C. |
| 300 | 200° C. |
| 325 | 220° C. |
| 350 | 220° C. |

*Not an example of this invention.

EXAMPLE 4

Corrosion Testing, 175° F. (79.4° C.)

The thermally treated products from Examples 1B and 2B were tested for their corrosion inhibition properties by the following procedure.

Corrosion inhibition of various samples was determined under conditions which simulate conditions that exist in oil and gas wells as follows. A brine solution containing 89.89 percent deionized water, 9.62 percent sodium chloride, 0.305 percent calcium chloride and a 0.186 percent hydrated magnesium chloride complex was prepared. This brine solution was saturated under carbon dioxide purge until a pH of 3.8 was achieved. The solution was treated with sodium persulfate to remove oxygen. The desired corrosion inhibitor was added to the solution. About 720 milliliters (ml) of this brine solution and 80 ml of kerosene treated with sodium persulfate were charged into a 32-ounce bottle. To this charge was added enough hydrated sodium sulfide to generate a suitable amount of hydrogen sulfide (i.e., about 300 ppm hydrogen sulfide based on total fluids).

Metal coupons of 1020 carbon steel were degreased with an inhibited methylchloroform, acidized with 16 percent hydrochloric acid, washed and dried. Each coupon weighed about 19 g. A metal coupon was placed in the bottle containing the brine. kerosene and ingredients as previously described. The bottle was capped and acetic acid was injected into the bottle through a septum. The bottle was placed on a vertically rotating wheel held at 175° F. (79.3° C.) and the sample was rotated at 26 rpm for 24 hours (86400 s). The coupons were removed from the bottle, cleaned, washed, dried and reweighed and the percent protection afforded them by the inhibitor is calculated as the percent protection by the following formula:

$$\% \text{ protection} = 100 - \frac{\text{inhibitor coupon wt. loss}}{\text{blank coupon wt. loss}} \times 100$$

The weight loss is given to the nearest whole percent. The tests wherein no inhibitor is employed are for comparative purposes and are designated as blanks.

The corrosion rates are also determined in milliinches per year (mpy) corrosion rates by the following formula:

$$mpy = \frac{534 \text{ (Mg Weight Loss of Coupon)}}{d \times a \times t}$$

Mg = milligrams
d = density of 1020 carbon steel = 7.86 g/ml
a = surface area (in.) of metal coupons
t = test time in hours The amount of corrosion of untreated coupons was compared to coupons which were tested in the presence of 100 ppm of each corrosion inhibitor sample. Results are presented in Table III for the thermally rearranged acrolein/ethylenediamine oligomers prepared in Example 1-B.

TABLE III

| INHIBITOR Product From Heat Treatment at Indicated Temp. °C. | Conc. ppm | Weight Loss grams | % Protection | MPY** |
|---|---|---|---|---|
| No Inhibitor* | 0 | 0.1879 | 0 | 71.0 |
| No Heat Treatment* | 100 | 0.0351 | 81.3 | 13.3 |
| 125* | 100 | 0.0357 | 81.0 | 13.9 |
| 135* | 100 | 0.0402 | 78.6 | 15.7 |
| 150* | 100 | 0.0344 | 81.7 | 13.9 |
| 162* | 100 | 0.0325 | 82.7 | 12.5 |
| 170* | 100 | 0.0261 | 86.1 | 10.8 |
| 180 | 100 | 0.0381 | 83.2 | 13.0 |
| 190 | 100 | 0.0477 | 74.6 | 16.8 |
| 200 | 100 | 0.0309 | 83.6 | 12.6 |
| 250 | 100 | 0.0423 | 77.5 | 14.8 |

*Not an example of this invention.
**MPY is mils per year.

Results are presented in Table IV for the thermally rearranged acrolein/mixture of tetraethylenepentamine, pentaethylenehexamine, and hexaethyleneheptamine oligomers prepared in Example 2-B.

TABLE IV

| INHIBITOR Product From Heat Treatment at Indicated Temp. °C. | Conc. ppm | Weight Loss grams | % Protection | MPY** |
|---|---|---|---|---|
| No Inhibitor* | 0 | 0.2804 | 0 | 109.8 |
| No Heat Treatment* | 100 | 0.0394 | 81.2 | 15.2 |
| 100* | 100 | 0.0720 | 74.3 | 28.0 |
| 110* | 100 | 0.0621 | 77.9 | 24.1 |
| 140* | 100 | 0.0862 | 69.3 | 33.5 |
| 160* | 100 | 0.0844 | 69.9 | 32.7 |
| No Inhibitor* | 0 | 0.2439 | 0 | 93.7 |
| 180 | 100 | 0.0389 | 84.1 | 15.0 |
| 192 | 100 | 0.0328 | 86.6 | 12.7 |
| 250 | 100 | 0.0257 | 89.5 | 9.9 |
| No Inhibitor* | 0 | 0.2412 | 0 | 92.6 |
| 280 | 100 | 0.0687 | 71.5 | 26.6 |
| 300 | 100 | 0.0490 | 79.7 | 19.1 |
| 325 | 100 | 0.0388 | 83.9 | 15.1 |
| 350 | 100 | 0.0446 | 81.5 | 17.0 |

*Not an example of this invention.
**MPY is mils per year.

EXAMPLE 5

Preparation of Corrosion Inhibitor

Acrolein/ethylenediamine oligomers thermally rearranged at 250° C. (49.99 g) from example 1-B, Westvaco Diacid 1550 (76.91 g) and isopropanol (126.27 g) were weighed into a one liter 5 neck round bottom flask equipped with a condensing assembly, stirrer, thermometer and nitrogen inlet tube. The reactor contents were refluxed at 82° C. for 1 hour (3600 s). A Barrett was attached to the reactor. One hour and eleven minutes (4260 s) later, all isopropanol had been removed by using the Barrett trap. The reactor contents were heated at 210° C. for 2 hours 19 minutes (8340 s). Reactor contents (121.02 g) were cooled to less than 60° C. and then dissolved in isopropanol (196.45 g). This isopropanol solution was refluxed at 82° C. for 1 hour and 10 minutes (4200 s).

EXAMPLE 6

Preparation of Corrosion Inhibitor

Acrolein/ethylenediamine oligomers thermally rearranged at 250° C. (23.06 g) from Example 1-B, and 1-bromooctadecane (66.74 g) were weighed into a 500 ml resin kettle equipped with a condensing assembly, stirrer, thermometer and nitrogen inlet tube. The reactor contents were heated at 90° C. for 15 minutes (900 s) and then cooled to room temperature. 150 ml xylene (181.54 g) was added to reactor contents. Reactor contents were maintained at 75° C. for 35 minutes (2100 s). Reactor contents were heated between 60°–110° C. for 2 additional hours (7200 s).

EXAMPLE 7

Preparation of Corrosion Inhibitor

Acrolein/mixture of 14 area % tetraethylenepentamine, 42 area % pentaethylenehexamine and 27 area % hexaethyleneheptamine oligomers thermally rearranged at 250° C. (20.8 grams) from Example 2-B, 1-bromooctadecane (74.1 grams) and isopropanol (31.6 grams) were weighed into a reactor of the type described in Example 6. Area % was determined by gas chromatography. The reactor contents were stirred at 82.5° C. for one hour (3600 s). Isopropanol was removed at 90° C. by using a Dean Stark trap.

EXAMPLE 8

Corrosion Testing

The corrosion inhibitors prepared in Examples 5, 6 and 7 were tested employing the procedure of Example 4. The results are given in Table V.

TABLE V

| Inhibitor | Concentration ppm | Weight Loss grams | Percent Protection | MPY |
|---|---|---|---|---|
| None* | 0 | 0.2725 | 0 | 105.2 |
| Example 5 | 100 | 0.0328 | 88 | 12.3 |
| Example 6 | 100 | 0.0281 | 90 | 10.8 |
| None* | 0 | 0.1700 | 0 | 65.5 |
| Example 7 | 100 | 0.0178 | 89.5 | 6.8 |

*Not an example of this invention.

The data in Table V demonstrates that thermally rearranged α,β-unsaturated aldehyde/amine oligomers reacted with a fatty carboxylic acid or organic halide exhibits excellent corrosion protection under simulated down hole tests at 175° F.

EXAMPLE 9

Corrosion Testing, 350° F. (176.7° C.)

The performance of 100 ppm of a corrosion inhibitor sample also was tested in a 24 hour 350° F. (177° C.) wheel test containing 90 percent brine/8 percent heptane/2 percent kerosene at 2,000 psi pressure (25° C.) with 10 percent hydrogen sulfide, 10 percent carbon dioxide and 80 percent methane in a stainless steel pipe bomb. Results are presented in Table VI for the corrosion inhibitors prepared in Examples 5, 6 and 7.

TABLE VI

| Inhibitor | Concentration ppm | Weight Loss grams | Percent Protection | MPY |
|---|---|---|---|---|
| None* | 0 | 0.1443 | 0 | 135.0 |
| Example 5 | 100 | 0.0382 | 74 | 35.7 |
| Example 6 | 100 | 0.0311 | 79 | 29.1 |
| Example 7 | 100 | 0.0289 | 80 | 27.0 |

*Not an example of this invention.

The data in Table VI demonstrates that thermally rearranged α,β-unsaturated aldehyde/amine oligomers reacted with a fatty carboxylic acid or organic halide exhibits good corrosion protection under simulated down hole tests at 350° F.

EXAMPLE 10

In a manner similar to Example 1, an EDA/acrolein oligomer was prepared and the final yellow viscous product had an amine hydrogen equivalent weight of 59.

This EDA/acrolein oligomer was functionalized with lauric acid in a 1 liter reactor equipped with stirrer, thermometer, condenser, Dean-Stark trap, temperature controller, and nitrogen purge. To 50 grams of the EDA/acrolein oligomer was added 84.7 grams of lauric acid (which theoretically would react with 50% of the active amine hydrogens) and 202.5 grams of isopropanol. The reactor contents were heated to 84° C. for 1 hour. The isopropanol was removed and the reactor contents were heated to 210° C. for 4 hours. The reactor contents were cooled and isopropanol was added to make the final product 37% actives (EDA/Acrolein/Lauric Acid Adduct) in isopropanol.

EXAMPLE 11

In a manner similar to Example 10, oleic acid was reacted with the ethylenediamine/acrolein oligomer such that 70% of the active amine hydrogens were theoretically reacted.

EXAMPLE 12

In a manner similar to Example 10, tall oil fatty acid was reacted with the ethylenediamine/acrolein oligomer such that 50% of the active amine hydrogens were theoretically reacted.

EXAMPLE 13

In a manner similar to Example 10, a $C_{22}$ dimer acid from Westvaco (Westvaco diacid 1550) was reacted with the ethylenediamine/acrolein oligomer such that 70% of the active amine hydrogens were theoretically reacted.

EXAMPLE 14

In a manner similar to Example 10, a $C_{36}$ dimer acid from Emery (Empol 1003) was reacted with the ethylenediamine/acrolein oligomer such that 50% of the active amine hydrogens were theoretically reacted.

EXAMPLE 15

In a manner similar to Example 10, a napthenic acid was reacted with the ethylenediamine/acrolein oligomer such that 75% of the active amine hydrogens were theoretically reacted.

EXAMPLE 16

In a manner similar to Example 10, a neodecanoic acid was reacted with the ethylenediamine/acrolein oligomer such that 75% of the active amine hydrogens were theoretically reacted.

EXAMPLE 17

Into a reactor equipped with stirrer, thermometer, condenser, Dean-Stark trap, temperature controller, and nitrogen purge was charged 714 grams of ethylenediamine (11.9 moles) and 547 grams methanol. Over a 3 hour period, 667.5 grams of acrolein (11.9 moles) diluted in 623.9 grams of methanol was added to the reactor contents at a temperature between 1° C. and 5° C. The methanol was removed via distillation and the reactor contents diluted to 70% actives with isopropanol. The resulting product had an amine hydrogen equivalent weight of 68.4.

35.4 grams of the above prepared EDA/acrolein oligomer, 60.0 grams of methanol, and 73.6 grams of loctadecylbromide were charged into a reactor and refluxed at 70°-75° C. for 2 hours. The methanol was removed and the reactor contents heated to 210° C. for 6 hours.

EXAMPLE 18

56 grams of an EDA/acrolein oligomer prepared similiarly to Example 1 and 34 grams of isopropanol were charged to a reactor and heated to 50° C. 127 grams of benzyl chloride was added over a 1.3 hour period and the reactor contents refluxed for 1.75 hours at 84° C. Due to viscosity buildup during the reaction, 200 grams of isopropanol were added to the reactor contents to reduce viscosity. Chloride analysis determined that the reaction proceeded to at least 90% completion.

EXAMPLE 19

443.7 grams of a 37% actives (ethylenediamine/acrolein/tall oil fatty acid adduct) prepared similiarly to Example 12 except that 75% of the active amine hydrogens were theoretically reacted and the product was diluted in isobutanol and charged to a reactor. 115.3 grams of benzoyl chloride was added to the reactor contents at ambient and the reactor contents exothermed to 65° C. After exotherm subsided, the reactor contents were heated to 90° C. for 6 hours.

EXAMPLE 20

The corrosion inhibitors prepared in examples 10 through 19 were tested employing the procedures detailed in examples 4 and 9 at 100 ppm active concentrations. The results are given in Table VII.

TABLE VII

| Inhibitor | Hydrophobe | Percent Protection | |
|---|---|---|---|
| | | 175° F. | 350° F. |
| Ex. 10 | Lauric Acid | 79 | 82 |
| Ex. 11 | Oleic Acid | 98 | — |
| Ex. 12 | Tall Oil Fatty Acid | 95 | 85 |
| Ex. 13 | C22 Dimer Acid | 87 | 86 |
| Ex. 14 | C36 Dimer Acid | 86 | 88 |
| Ex. 15 | Napthenic Acid | 91 | 86 |
| Ex. 16 | Neodecanoic Acid | 97 | 82 |
| Ex. 17 | Octadecylbromide | 96 | — |
| Ex. 18 | Benzyl Chloride | 85 | — |
| Ex. 19 | Tall Oil Fatty Acid | 94 | 74 |

TABLE VII-continued

| Inhibitor | Hydrophobe | Percent Protection | |
|---|---|---|---|
| | | 175° F. | 350° F. |
| | Benzoyl Chloride | | |

The data in Table VII demonstrates that termally rearranged α,β-unsaturated aldehyde/amine oligomers reacted with alkyl and cycloalkyl fatty acids with various carbon chain lengths or organic halides exhibits good corrosioon protection under simulated down hole tests at 350° F.

EXAMPLE 21

Into a jacket cooled reactor equipped with a condenser assembly, mechanical stirrer, nitrogen inlet tube, and thermometer were placed 114.35 grams of ethylenediamine (EDA), 20.28 grams of a $C_{12}$–$C_{14}$ fatty monoamine witco (P650), and 314.42 grams of methanol. 112.07 grams of acrolein was added slowly to the reactor such that the reaction temperature averaged 1° to 5° C. After the addition was complete the methanol was distilled and the resulting product had an amine hydrogen equivalent weight of 67.3.

102.45 grams of this product was charged into a reactor along with 561.94 grams of isopropanol. 413.91 grams of a $C_{22}$ dimer acid (Westvaco diacid 1550) was added and the reactor temperature was increased to 85° C. for 1 hour. The isopropanol was removed and the reactor temperature was increased to 210° C. for 4 hours. The resulting product was diluted with isopropanol to make the final product 43% actives.

EXAMPLE 22

In a manner similar to Example 21, 1,3-propanediamine (PDA) was reacted with acrolein in approximately a 6 to 1 mole ratio. The resulting product had an amine hydrogen equivalent weight of 58.01. 213.28 grams of this product was subsequently reacted with 228.36 grams of the $C_{22}$ dimer acid (Westvaco Diacid 1550) and heated to 220° C. for 3.5 hours.

EXAMPLE 23

In a manner similar to Example 21, ethylenediamine (EDA) and acrolein were reacted in a 1 to 1 mole ratio and subsequently functionalized with Westvaco Diacid 1550 such that 70% of the active amine hydrogens were theoretically reacted.

EXAMPLE 24

In a manner similar to Example 23, diethylenetriamine (DETA) was reacted with acrolein in a 1 to 1 mole ratio and functionalized with Westvaco Diacid 1550 such that 70% of the active amine hydrogens were theoretically reacted.

EXAMPLE 25

In a manner similar to Example 23, aminoethylpiperazine (AEP) was reacted with acrolein in a 3 to 1.5 mole ratio (amine hydrogen equivalent weight=66.27) and functionalized with Westvaco Diacid 1550 such that 70% of the active amine hydrogens were theoretically reacted.

EXAMPLE 26

In a manner similar to Example 23, triethylenetetramine (TETA) was reacted with acrolein in a 1 to 1 mole ratio (amine hydrogen equivalent weight=55.05) and functionalized with Westvaco Diacid 1550 such that 70% of the active amine hydrogens were theoretically reacted.

EXAMPLE 27

In a manner similar to Example 23, aminoethylethanolamine (AEEA) was reacted with acrolein in a 1.5 to 1 mole ratio (amine hydrogen equivalent weight=51) and functionalized with Westvaco Diacid such that 70% of the active amine hydrogens were theoretically reacted.

EXAMPLE 28

The corrosion inhibitors prepared in Examples 21 through 27 were tested employing the procedures detailed in Examples 4 and 9 at 100 ppm active concentrations. The results are given in Table VIII.

TABLE VIII

| Inhibitor | Amine/Aldehyde | Percent Protection | |
|---|---|---|---|
| | | 175° F. | 350° F. |
| Ex. 21 | P650/EDA/Crotonaldehyde | 88 | 83 |
| Ex. 22 | PDA/Acrolein | 91 | — |
| Ex. 23 | EDA/Acrolein | 87 | 86 |
| Ex. 24 | DETA/Acrolein | 94 | — |
| Ex. 25 | AEP/Acrolein | 82 | 84 |
| Ex. 26 | TETA/Acrolein | 94 | 83 |
| Ex. 27 | AEEA/Acrolein | 86 | 85 |

The data in Table VIII demonstrates that thermally rearranged alkyl, cycloalkyl, alkanoldiamines, or blends of fatty amines with any combination of these diamines when reacted with acrolein or crotonaldehyde and functionalized with a C22 fatty acid exhibits good corrosion protection under simulated down hole tests at 350° F.

EXAMPLE 29

Into a reactor equipped with a condenser assembly, mechanical stirrer, nitrogen inlet tube, and thermometer was placed 50 grams of an ethylenediamine/acrolein oligomer (prepared similarly to Example 1, amine hydrogen equivalent weight of 52.03), 138.38 grams of tall oil fatty acid, and 282.57 grams of isopropanol. The reactor contents were heated to 85° C. for 1 hour and heated at 210° C. for 6 hours. The product was diluted with isopropanol to 37% actives.

EXAMPLE 30

In a manner similar to Example 29, an E100/acrolein oligomer with an amine hydrogen equivalent weight of 49 was reacted with tall oil fatty acid such that 50% of the active amine hydrogens were theoretically reacted.

EXAMPLE 31

In a manner similiar to Example 29, an ethylenediamine/crotonaldehyde oligomer with an amine hydrogen equivalent weight of 71 was reacted with tall oil fatty acid such that 70% of the active amine hydrogens were theoretically reacted.

EXAMPLE 32

In a manner similiar to Example 29, an ethylenediamine/furfural oligomer with an amine hydrogen equivalent weight of 62 was reacted with tall oil fatty acid such that 70% of the active amine hydrogens were theoretically reacted.

EXAMPLE 33

In a manner similiar to Example 29, a ethylenediamine/nonenal oligomer with an amine hydrogen equivalent weight of 78 was reacted with tall oil fatty acid such that 70% of the active amine hydrogens were theoretically reacted.

EXAMPLE 34

In a manner similiar to Example 29, a tetraethylenepentamine/cinnamaldehyde oligomer with an amine hydrogen equivalent weight of 64 was reacted with tall oil fatty acid such that 70% of the active amine hydrogens were theoretically reacted.

EXAMPLE 35

In a manner similiar to Example 29, a hexamethylenediamine/crotonaldehyde oligomer with an amine hydrogen equivalent weight of 55 was reacted with tall oil fatty acid such that 70% of the active amine hydrogens were theoretically reacted.

EXAMPLE 36

The corrosion inhibitors prepared in Examples 29 through 35 were tested employing the procedures detailed in Examples 4 and 9 at 100 ppm active concentrations. The results are given in Table IX.

TABLE IX

| Inhibitor | Amine/Aldehyde | Percent Protection | |
|---|---|---|---|
| | | 175° F. | 350° F. |
| Ex. 29 | EDA/Acrolein | 95 | 85 |
| Ex. 30 | E-100/Acrolein | 95 | 90 |
| Ex. 31 | EDA/Crotonaldehyde | 97 | 78 |
| Ex. 32 | EDA/Furfural | 95 | 71 |
| Ex. 33 | EDA/Nonenal | 96 | 59 |
| Ex. 34 | TEPA/Cinnamaldehyde | 99 | 57 |
| Ex. 35 | HMDA/Crotonaldehyde | 98 | 56 |

The data in Table IX demonstrates that low molecular weight alpha, beta unsaturated aldehydes provide unexpectedly good corrosion protection under simulated down hole tests at 350° F. Acrolein and crotonaldehyde are the preferrred alpha, beta unsaturated aldehydes. Additionally, high molecular weight diamines such as hexamethylenediamine with 5 or more carbon atoms per repeating unit provide less corrosion protection at high temperatures than diamines with only two to four carbon atoms per repeating unit.

We claim:

1. A process for reducing or preventing the corrosion of ferrous alloys in contact with corrosive liquids or gases which process comprises contacting the surface of said ferrous metal alloy with a corrosive inhibiting amount of a corrosion inhibitor composition comprising the reaction product of (I) the product resulting from reacting at a temperature of from about 0° C. to about 150° C.
  (A) at least one aliphatic $\alpha,\beta$-monoethylenically unsaturated aldehyde having from about 3 to about 6 carbon atoms; and
  (B) at least one organic polyamine represented by the formula

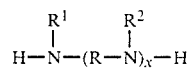

wherein R is a divalent saturated $C_2$ to $C_4$ aliphatic hydrocarbon group; each $R^1$ and $R^2$ is independently hydrogen or a saturated alkyl amino or alkyloxy group containing from 2 to about 4 carbon atoms or when taken together, $R^1$ and $R^2$ form a bridging alkylene radical containing from 2 to about 4 carbon atoms such that R, $R^1$ and $R^2$ and two nitrogen atoms form a heterocyclic ring containing 4 carbon atoms; x has a value from 1 to about 8; and components (A) and (B) are employed in a mole ratio of (A) to (B) of from about 1:1 to abaout 1:6, and wherein said reaction product of components (A) and (B) is thermally treated at a temperature of at least about 180° C. for a time sufficient to render the resultant thermally treated product with a stability temperature at least 25° C. above the stability temperature of the untreated product; and (II) (A) at least one saturated or unsaturated, cyclic or acyclic aliphatic mono- or polycarboxylic acid having from about 2 to about 54 carbon atoms; or (B) at least one saturated or unsaturated, cyclic or acyclic aliphatic mono- or polyalkyl halide having from about 2 to about 50 carbon atoms; or (C) a combination of (II-A) and (II-B);

wherein components (I) and (II) are employed in quantities which provide from about 0.4 to about 1 equivalent of carboxyl or halide groups from component (II) for each theoretically active amino hydrogen atom contained in component (I).

2. A process of claim 1 wherein
(a) said thermal treatment is conducted at a temperature of from about 190° C. to about 350° C. for from about 10 minutes to about 48 hours;
(b) component (II-A) has from about 12 to about 36 carbon atoms; and
(c) components (I) and (II) are employed in quantities which provide from about 0.55 to about 0.85 equivalent of carboxyl or halide groups from oomponent (II) for each theoretically active amino hydrogen atom contained in component (I).

3. A process of claim 2 wherein;
(a) component (II-A) has from about 16 to about 20 carbon atoms; and
(b) components (I) and (II) are employed in quantities which provide from about 0.65 to about 0.75 equivalent of carboxyl or halide groups from component (II) for each theoretically active amino hydrogen atom contained in component (I).

4. A process of claim 3 wherein
(a) component (I) (A) is acrolein, crotonaldehyde, or combination thereof;
(b) component (I) (B) is ethylenediamine, diethylenetriamine, triethylenetetramine, tetraethylenepentamine, pentaethylenehexamine, hexaethyleneheptamine or any combination thereof; and
(c) component (II) is tall oil fatty acid, dimerized tall oil fatty acid, trimerized tall oil fatty acid or any combination thereof.

5. A process of claim 2 wherein the reaction product of components (I-A) and (I-B) is an oligomer having an amine hydrogen equivalent weight of from about 50 to about 80.

6. A process of claim 3 wherein the reaction product of components (I-A) and (I-B) is an oligomer having an amine hydrogen equivalent weight of from about 50 to about 80.

7. A process of claim 4 wherein the reaction product of components (I-A) and (I-B) is an oligomer having an amine hydrogen equivalent weight of from about 50 to about 80.

8. A process of claim 1 wherein said corrosion inhibitor composition is employed in an amount of from about 5 to about 100,000 parts per million parts by weight based upon the weight of the corrosive liquid or gas in contact with said ferrous metal alloy and said ferrous metal alloy is in the configuration of brine, oil or gas well production equipment or piping, either above ground or down hole.

9. A process of claim 8 wherein when the process is a continuous treatment, the amount of corrosion inhibitor is from about 50 to about 1000 and when the process is a batch treatment, then the amount of corrosion inhibitor is from about 10,000 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

10. A process of claim 9 wherein when the process is a continuous treatment, the amount of corrosion inhibitor is from about 100 to about 200 and when the process is a batch treatment, then the amount of corrosion inhibitor is from about 40,000 to about 60,000 parts per million parts by weight based upon the weight of the corrosive liquid or gas in contact with said ferrous metal alloy and said ferrous metal alloy is in the configuration of brine, oil or gas well production equipment and piping either above ground or down hole.

11. A process of claim 10 wherein said corrosion inhibitor is dissolved or dispersed in a carrier liquid which in turn is dissolved or dispersed in said corrosive liquid or gas.

12. A process of claim 2 wherein said corrosion inhibitor composition is employed in an amount of from about 5 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

13. A process of claim 12 wherein when the process is a continuous treatment, the amount of corrosion inhibitor is from about 50 to about 1000 and when the process is a batch treatment, then the amount of corrosion inhibitor is from about 10,000 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

14. A process of claim 13 wherein when the process is a continuous treatment, the amount of corrosion inhibitor is from about 100 to about 200 and when the process is a batch treatment, then the amount of corrosion inhibitor is from about 40,000 to about 60,000 parts per million parts by weight based upon the weight of the corrosive liquid or gas in contact with said ferrous metal alloy and said ferrous metal alloy is in the configuration of brine, oil or gas well production equipment and piping either above ground or down hole.

15. A process of claim 14 wherein said corrosion inhibitor is dissolved or dispersed in a carrier liquid which in turn is dissolved or dispersed in said corrosive liquid or gas.

16. A process of claim 3 wherein said corrosion inhibitor composition is employed in an amount of from about 5 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

17. A process of claim 16 wherein when the process is a continuous treatment, the amount of corrosion inhibitor is from about 50 to about 1000 and when the process is a batch treatment, then the amount of corrosion inhibitor is from about 10,000 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

18. A process of claim 17 wherein when the process is a continuous treatment, the amount of corrosion inhibitor is from about 100 to about 200 and when the process is a batch treatment, then the amount of corrosion inhibitor is from about 40,000 to about 60,000 parts per million parts by weight based upon the weight of the corrosive liquid or gas in contact with said ferrous metal alloy and said ferrous metal alloy is in the configuration of brine, oil or gas well production equipment and piping either above ground or down hole.

19. A process of claim 18 wherein said corrosion inhibitor is dissolved or dispersed in a carrier liquid which in turn is dissolved or dispersed in said corrosive liquid or gas.

20. A process of claim 4 wherein said corrosion inhibitor composition is employed in an amount of from about 5 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

21. A process of claim 20 wherein when the process is a continuous treatment, the amount of corrosion inhibitor is from about 50 to about 1000 and when the process is a batch treatment, then the amount of corrosion inhibitor is from about 10,000 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

22. A process of claim 21 wherein when the process is a continuous treatment, the amount of corrosion inhibitor is from about 100 to about 200 and when the process is a batch treatment, then the amount of corrosion inhibitor is from about 40,000 to about 60,000 parts per million parts by weight based upon the weight of the corrosive liquid or gas in contact with said ferrous metal alloy and said ferrous metal alloy is in the configuration of brine, oil or gas well production equipment and piping either above ground or down hole.

23. A process of claim 22 wherein said corrosion inhibitor is dissolved or dispersed in a carrier liquid which in turn is dissolved or dispersed in said corrosive liquid or gas.

24. A process of claim 5 wherein said corrosion inhibitor composition is employed in an amount of from about 5 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

25. A process of claim 24 wherein when the process is a continuous treatment, the amount of corrosion inhibitor is from about 50 to about 1000 and when the process is a batch treatment, then the amount of corrosion inhibitor is from about 10,000 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

26. A process of claim 25 wherein when the process is a continuous treatment, the amount of corrosion inhibitor is from about 100 to about 200 and when the process is a batch treatment, then the amount of corrosion inhibitor is from about 40,000 to about 60,000 parts per million parts by weight based upon the weight of the corrosive liquid or gas in contact with said ferrous metal alloy and said ferrous metal alloy is in the configuration of brine, oil or gas well production equipment and piping either above ground or down hole.

27. A process of claim 26 wherein said corrosion inhibitor is dissolved or dispersed in a carrier liquid which in turn is dissolved or dispersed in said corrosive liquid or gas.

28. A process of claim 6 wherein said corrosion inhibitor composition is employed in an amount of from about 5 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

29. A process of claim 28 wherein when the process is a continuous treatment, the amount of corrosion inhibitor is from about 50 to about 1000 and when the process is a batch treatment, then the amount of corrosion inhibitor is from about 10,000 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

30. A process of claim 29 wherein when the process is a continuous treatment, the amount of corrosion inhibitor is from about 100 to about 200 and when the process is a batch treatment, then the amount of corrosion inhibitor is from about 40,000 to about 60,000 parts per million parts by weight based upon the weight of the corrosive liquid or gas in contact with said ferrous metal alloy and said ferrous metal alloy is in the configuration of brine, oil or gas well production equipment and piping either above ground or down hole.

31. A process of claim 30 wherein said corrosion inhibitor is dissolved or dispersed in a carrier liquid which in turn is dissolved or dispersed in said corrosive liquid or gas.

32. A process of claim 7 wherein said corrosion inhibitor composition is employed in an amount of from about 5 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

33. A process of claim 32 wherein when the process is a continuous treatment, the amount of corrosion inhibitor is from about 50 to about 1000 and when the process is a batch treatment, then the amount of corrosion inhibitor is from about 10,000 to about 100,000 parts per million parts by weight based upon the weight of the corrosive liquid or gas in contact with said ferrous metal alloy and said ferrous metal alloy is in the configuration of brine, oil or gas well production equipment and piping either above ground or down hole.

34. A process of claim 33 wherein when the process is a continuous treatment, the amount of corrosion inhibitor is from about 100 to about 200 and when the process is a batch treatment, then the amount of corrosion inhibitor is from about 40,000 to about 60,000 parts per million parts by weight based upon the weight of the corrosive liquid or gas in contact with said ferrous metal alloy and said ferrous metal alloy is in the configuration of brine, oil or gas well production equipment and piping either above ground or down hole.

35. A process of claim 34 wherein said corrosion inhibitor is dissolved or dispersesd in a carrier liquid which in turn is dissolved or dispersed in said corrosive liquid or gas.

* * * * *